United States Patent [19]

Cooper

[11] Patent Number: 4,595,136

[45] Date of Patent: Jun. 17, 1986

[54] COMBINATION TOOL FOR GAS WELDERS

[76] Inventor: Alvin J. Cooper, 500 W. King St., c/o American Wicker & Wood, Boone, N.C. 28607

[21] Appl. No.: 659,673

[22] Filed: Oct. 11, 1984

[51] Int. Cl.⁴ .............................................. B23K 5/22
[52] U.S. Cl. ........................................ 228/57; 15/105; 15/104.05; 7/170
[58] Field of Search .............. 228/57; 206/86; 15/105; 7/170; 431/276

[56] References Cited

U.S. PATENT DOCUMENTS

| | | | |
|---|---|---|---|
| 299,071 | 5/1884 | Hoagland | 7/170 |
| 2,939,575 | 6/1960 | Tarare | 206/86 |
| 3,052,112 | 9/1962 | Wheeler | 431/276 |
| 3,315,295 | 4/1967 | Jeter et al. | 15/105 |
| 3,672,374 | 6/1972 | Mancuso | 131/243 |

Primary Examiner—Nicholas P. Godici
Assistant Examiner—Karen Skillman
Attorney, Agent, or Firm—Keith S. Bergman

[57] ABSTRACT

A single tool, especially for use by gas welders, that combines a soapstone marker, a rotary spark igniter and a plurality of torch cleaning wires. The tool is of metal construction, of pencil-like shape, readily manually manipulable, and easily releasably carried in or on the clothing of a mechanic.

2 Claims, 8 Drawing Figures

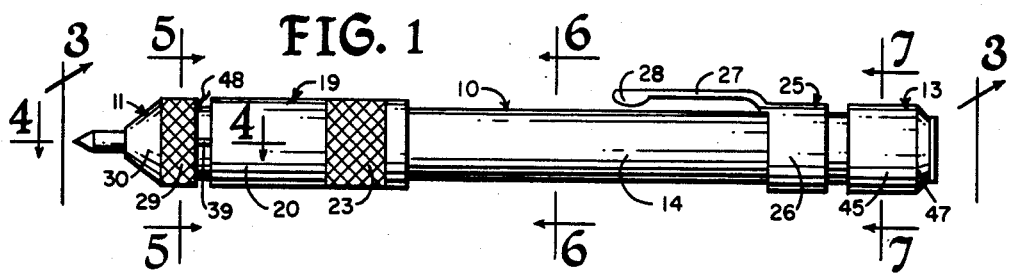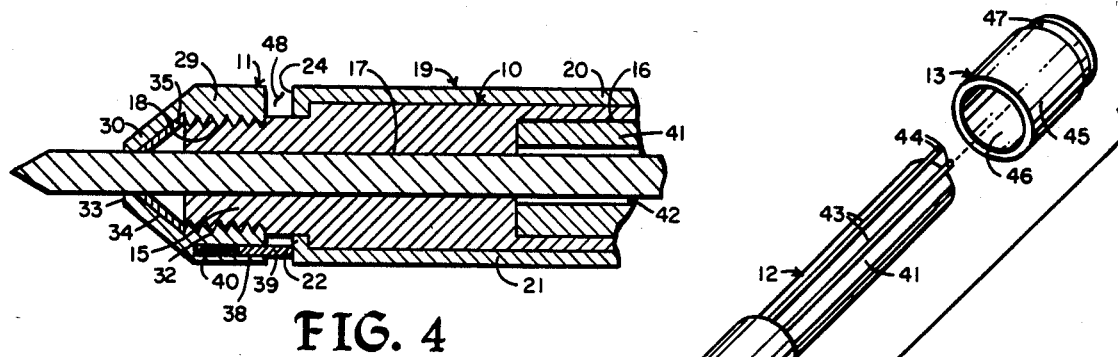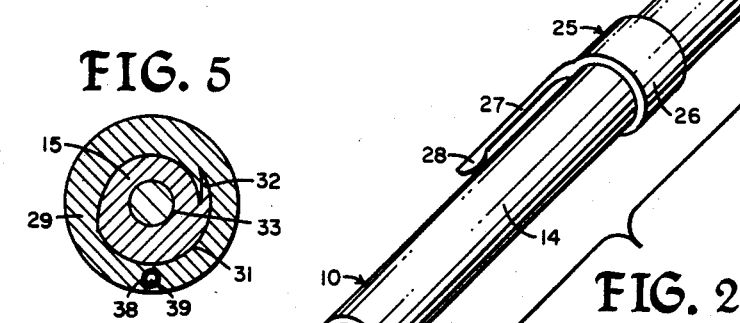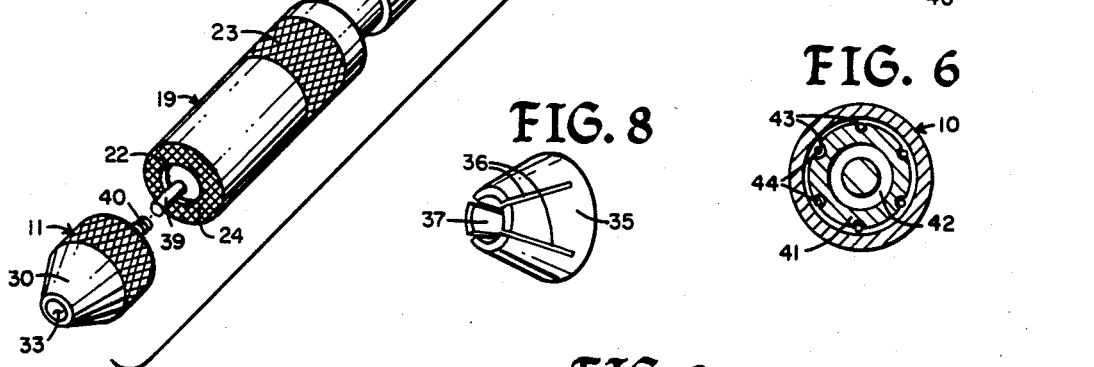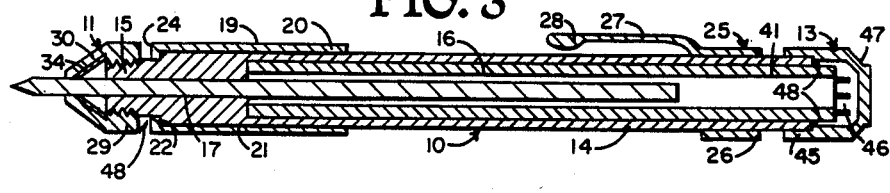

COMBINATION TOOL FOR GAS WELDERS

BACKGROUND OF INVENTION

1. RELATED APPLICATIONS

There are no applications related hereto heretofore filed in this or any foreign country.

2. FIELD OF INVENTION

My invention relates generally to rotary flint-type spark igniters for gas welding torches and more particularly to such an igniter that also provides in a single tool a soapstone marker and plural torch cleaning wires.

3. DESCRIPTION OF PRIOR ART

In the gas welding arts three universal and commonly used tools are the soapstone for marking, the igniter for lighting a torch and cleaning rods to clean the orifices defined in torches, especially those of the cutting variety. These tools individually have long been known and used. Commonly in the past each tool has constituted an entity onto itself and no one commonly has been associated with any other, though generally all of these tools are used at substantially the same time. The instant invention seeks to provide a single structure that combines particular forms of the three tools so that all or any may be available as desired.

Soapstones commonly have been used by mechanics as marking tools without any encasement or support and their ability to be so used has been one of the chief elements causing their popularity. The normal environs of soapstone usage, however, are quite destructive of their physical configuration and the stones themselves commonly are a rather rough and unsophisticated marking tool. In the modern day welding arts there is a fairly high degree of sophistication and often a marker that will make a linear mark that may be quite accurately positioned is not only desirable but sometimes necessary. The instant tool provides such a marker, somewhat in the style of an ordinary mechanical pencil, with a holding structure that surrounds and protects the soapstone marking element and within which it may be retracted during periods of non use for protection.

Spark-type welding igniters have in general been of the flint and striker type and the instant invention adds a new member to this group of device. In the past such igniters as used in the welding arts have generally provided a relatively open striking surface which is susceptible to impact-type physical damage and especially flame impingement from an ignited torch. The instant invention in contrast provides a flint and striking surface arrayed between the ends of two relatively rotating cylinders to tend to eliminate both impact-type damage and any substantial flame impingement that might damage either flint or striking surface. This arrangement also tends to allow a more even mechanically determined pressure between flint and striking surface for more positive sparking as opposed especially to traditional hand manipulated strikers wherein such force is determined rather randomly by of the nature of the manual manipulation.

Torch cleaning devices have almost universally comprised a plurality of long, slender metallic rods or wires to allow cleaning of differently sized torch holes by their passage therethrough. These rods are more convenient and effective for use if they maintain a linear configuration and obviously must be maintained in proximity to avoid loss and be available for use. My invention maintains a plurality of such cleaning rods totally within a container by magnetic force so that the rods are readily available when desired and are yet physically protected when not in use.

My invention lies not in any one of these features per se, but rather in the particular and unique synergetic combination of all of them as disclosed and specified.

SUMMARY DESCRIPTION OF INVENTION

My invention provides a pencil-like structure with an elongate cylindrical body defining a medial channel and carrying a tip structure at one end and a removable cap at the other. The tip structure provides a chuck to releasably position a soapstone therein. A groove is defined about the peripheral surfaces of the tip and body at their joinder. A striking cap is rotatably carried on the body end adjacent the tip and a flint is carried by the peripheral portion of the tip, in an axially parallel orientation, and mechanically bias toward the striking cap, so that sparks may be generated upon rotation of the striking cap. The tool body carries an elongate cylindrical cleaning wire holder defining a medial channel to allow passage of the soapstone therethrough and a plurality of axially aligned peripheral grooves each to accept a cleaning rod. The cleaning wire holder provides magnetic force to maintain magnetically permeable cleaning rods in its grooves once they are so positioned, but yet allow their ready removal. A cap is releasably positioned over the end of the body through which the cleaning rod carrier may be removed to protect and maintain that carrier during periods of non-use.

In providing such a tool it is:

A principal object of my invention to provide a single tool that has the combined capabilities of a marking soapstone, flint-striker type igniter, and holder for torch cleaning wires.

A further object of my invention to provide such a tool that releasably positions a soapstone marking element in such fashion that only its tip is exposed and unprotected in the operative mode and in the inoperative mode it may be completely protected.

A further object of my invention to provide in such a tool a flint-striker igniting device so configured that the striking surface is substantially protected from damage to its surface from impact of objects or flame impingement.

A further object of my invention to provide such a tool that releasably maintains a plurality of torch hole cleaning wires in completely contained fashion to maintain assemblage and provide protection but yet allow ready use.

A still further object of my invention to provide such a device that is of new and novel design, of rugged and durable nature, of simple and economic manufacture, and one that is otherwise well adopted to the uses and purposes for which it is intended.

Other and further objects of my invention will appear from the following specifications and accompanying drawings which form a part hereof. In carrying out the objects of my invention, however, it is to be understood that its essential features are susceptible of change in design and structural arrangement with only one preferred and practical embodiment being illustrated in the accompanying drawings as, is required.

BRIEF DESCRIPTION OF DRAWINGS

In the accompanying drawings which form a part hereof and in which like numbers of reference refer to similar parts throughout:

FIG. 1 is an orthographic side view of my invention showing its various parts, their configuration and relationship.

FIG. 2 is an expanded isometric view of the invention of FIG. 1 showing the same elements more fully and in greater detail.

FIG. 3 is an elongate medial cross-sectional view of the tool of FIG. 1, taken on the line 3—3 thereon in the direction indicated by the arrows.

FIG. 4 is a similar but enlarged horizontal cross-sectional view of the tip structure of the tool of FIG. 1, taken on the line 4—4 thereon in the direction indicated by the arrows.

FIG. 5 is an enlarged traverse cross-sectional view through the tip of the tool of FIG. 1, taken on the line 5—5 thereon in the direction indicated by the arrows.

FIG. 6 is an enlarged traverse cross-sectional view through the medial body structure of the tool of FIG. 1, taken on the line 6—6 thereon in the direction indicated by the arrows.

FIG. 7 is an enlarged traverse cross-sectional view through the cap structure of the tool of FIG. 1, taken on the line 7—7 thereon in the direction indicated by the arrows.

FIG. 8 is an enlarged isometric view of the jaw structure of the chuck of my tool.

DESCRIPTION OF PREFERRED EMBODIMENT

My invention generally provides elongate body 10 carrying tip structure 11 at one end, cleaning wire holder 12 in a medial channel, and releasably positionable cap 13 at the other end.

Body 10 comprises rigid cylinder 14 defining somewhat diametrically smaller cylindrical tip connector 15 in its tip end and medial channel 16 extending from the cap end inwardly to a spaced distance from the tip connector. The tip connector defines medial axially aligned marker channel 17 extending from the tip end of the body inwardly to communicate with the medial channel. The marker channel is of size and cross-sectional shape to support a marker element to be associated with the tool in a slideable fashion. The circular periphery of the tip connector defines threads 18 in its forward or tip facing end to threadedly engage tip element 11 and releasably maintain it.

Striker element 19 comprises cylindrical striker body 20 defining medial axially aligned body channel 21 and inwardly extending annular striker disk 22 in its tip-facing end. Body channel 21 is of such size as to provide a freely rotatable fit for the strike element upon the tip facing end of body cylinder 14 and striker disk 22 is of such configuration as to define a medial circular channel to rotatably fit about tip connector 15. Preferably at least portion 23 of the circular peripheral surface of the striker is knurled to aid manual rotation of the structure when desired. The planar tip-facing surface 24 of the striker disk is formed so as to create sparks when a flint moves thereover with some frictional engagement. Normally this may be accomplished by finely knurling that surface. If the material from which the striker is formed is not hard enough to fulfill this requirement, it may be necessary to face that surface with some appropriate material in proper configuration.

The tool body carries fastening clip 25 inwardly adjacent its cap end. The fastening clip, in the instance illustrated, is of the type commonly used in pens or pencils comprising cylindrical ring-like body 26 frictionally engageable on cylinder 14 and structurally supporting elastically resilient, elongate clip body 27 carrying bulbously enlarged fastening portion 28 in its outer end part. With this structure an article of clothing such as a portion of a pocket or the edge of a garment may be engaged between the clip structure and my tool body 14 so that the tool will be releasably maintained on the clothing element when so positioned.

Tip structure 11 provides cylindrical body 29 structurally communicating with truncated conic portion 30. The body defines tip connector channel 31 having internal threads 32 to threadedly engage threads 18 defined on the tip connector of the tool body. The tip body extends inwardly a spaced distance from the tool body to define spark groove 48 therebetween.

The truncated portion of the tip defines medial conic chuck chamber 34 to accept truncated conic chuck 35 therein. This chuck provides plural slits 36 extending from its smaller base to a spaced distance from its larger base. These slits in combination with the resiliently deformable nature of the chuck and its relative thickness allow some flexibility in the forward portion of the element so that when it is positioned in chamber 34, as illustrated, tip 29, 30 may be screwed toward the tool body sufficiently to compress the chuck against a marker held in its channel 37 to positionally maintain that element relative to the chuck. This type of chuck is well known in the mechanical arts and not new per se.

Flint hole 38 is defined in the tool body facing surface of tip body 29, at a spaced distance inwardly adjacent the circular periphery of that element and in such fashion that cylindrical flint 39 supported therein will come into contact with striking surface 24 of striker 19, as illustrated particularly in FIG. 4. Cylindrical compression spring 40, sized to fit within flint hole 38 behind flint 39, biases the flint to an outward position so that it has some substantial frictional contact with striking surface 24 of the spacedly adjacent striker. With this structure then the striker may be manually rotated and upon such rotation the frictional engagement of flint 39 with striking surface 24 will generate sparks which will be emitted in a tangential direction from groove 48 defined between the adjacent surfaces of tip 29 and striker 19.

Cleaning wire holder 12 provides cylindrical body 41 defining medial axially aligned marker channel 42 and a plurality of axially parallel peripheral grooves 43, each adapted to contain a cleaning wire 44 of appropriate cross-sectional size. Cleaning wires 44 are of the traditional type that have heretofore been used for cleaning welding torches and of a cross sectional size to fit orifices in torches common in the modern day welding arts. The cross sectional configuration and size of cylindrical body 41 are such as to allow the body to slideably fit, with some frictional engagement, within medial channel 16 of tool body 10. The length of the wire holder is slightly greater then the length of that channel so that one end will project from the channel to allow it to be grasped for removal from the channel if necessary. The length of the cleaning wires also should be slightly greater then the length of holder body 41 so that they may be readily accessible and easily grasped.

The cleaning wire holder body is provided with some source of magnetic force to maintain magnetically permeable cleaning wires 44 within grooves 43. In the instance illustrated the body is formed of a polymeric plastic and impregnated with particulate ferro-magnetic material. The magnetic force may, however, be generated in other fashion, such as by magnetic tape carried within marker channel 42 or permanent magnetic devices otherwise associated. For the releasable positioning of cleaning wires in my tool by magnetic forces, the wires obviously must be formed of some magnetic permeable material, as generally they are, and the magnetic forces must be such as to maintain the wires but yet not maintain them with such force that they may not be readily manually removed from the cleaning wire holder when desired for use. The amount of magnetic force required may be determined empirically or by known engineering means.

Cap 13 provides cylindrical body portion 45 defining body channel 46 appropriately sized and configured to releasably fit with some frictional engagement upon the cap end portion of tool body 10. The outer end portion of the cap is enclosed by truncated conic structure 47 to maintain the cleaning wire holder within body channel 16. Radially inwardly extending annular stop 48 is provided in the outer portion of the body channel to prevent the cap from moving so far upon the tool body that it impinges upon the cleaning wires carried therein.

Having thusly described the structure of my invention, its operation may be readily understood.

Firstly a tool is formed according to the foregoing specifications. In the instance illustrated the tool is configured for use with a cylindrical soapstone marking element. To insert the marking element in the tool, tip 11 is loosened by screwing it forewardly on the tip connector of the tool body and the rearward portion of the marker is inserted through marker channel 33 in the tip and marker channel 37 in the chuck. The marker is manually manipulated so an appropriate portion of its end part projects from the tip and the tip then is screwed toward tool body 10. As this occurs chuck 35 is compressed, especially in its smaller cross-sectional portion, and when this compression is sufficient the chuck frictionally engages and maintains the external surface of the marker element.

Flint channel 38 is provided with an appropriately configured cylindrical flint 39 of length sufficient to cause ihe flint to have some substantial frictional engagement with striking surface 24 of cylindrical striker 19.

Cleaning wire holder 12 is provided with a plurality of cleaning wires of various cross sectional sizes appropriate to clean the orifices of torches with which the device is to be used. These cleaning wires are formed of some magnetically permeable material, most generally carbon tool steel of one sort or another.

To use the tool as a marker it is manually manipulated in the ordinary fashion of a pencil or an elongate soapstone element as heretofore used in the welding arts. As the marking element wears, or if it should break, the element is manually manipulated in the same fashion in which it was initially positionally established to change the amount of extension of the marker element from the tool so that the element will be appropriate for marking use. As noted in the drawings, the marking tip of the element may be sharpened if desired.

To use the tool as an igniter it is appropriately positioned laterally of the tip of the torch to be ignited, gas fuel is introduced through the torch tip, and upon its passage from the tip, striker 19 is rotated by manual manipulation, normally by the thumb of a user, to cause sparks. Those sparks should ignite the gas stream passing from the torch, and if not the procedure is repeated. It should be noted in this regard that sparks will exit from the striker groove generally perpendicular to the tool axis and along a tangential line through the point of contact of the flint with the striker surface. Depending upon the speed of rotation of the striker, sparks may be generated with some force so that they move some distance from the flint. This action allows the ignition of a torch from the side of a gas stream without impingement of the flame upon the sparking elements or the hands of a manipulator.

To use the cleaning wires of my invention, cap 13 is removed from the tool by manual manipulation and an appropriate cleaning wire manually removed from the holder. It should be noted that the cleaning wire holder when not in use maintains cleaning wires in a completely protected fashion when cap 13 is in place and by reason of its linear grooves also tends to prevent any bending in such wires.

The foregoing description of my invention is necessarily of a detailed nature so that a specific embodiment of it may be set forth as required. It is to be understood however that various modifications of detail, rearrangement and multiplication of parts may be resorted to without departing from its spirit, essence or scope.

Having thusly described my invention, what I desire to protect by Letters Patent and what I claim is:

1. A compound tool for welders comprising in combination;

a rigid elongate tool body defining a cross sectionally smaller tip connector at its first tip end, a medial channel extending from its second cap end to a spaced distance from the first tip end and a marker channel extending through the tip end to the medial channel;

a tip, having a cylindrical body and defining an axially aligned tip connector channel with threads to engage the tip connector of the tool body, structurally communicating with a truncated conic portion defining a medial marker channel in its apex portion communicating with a medial conic chuck chamber having therein a chuck defining a marker channel therethrough and adapted to constrict to frictionally engage a marker in the marker channel as it be compressed against portion of the tip defining the chuck chamber responsive to motion of the tip toward the body;

an elongate cylindrical cleaning wire holder defining a medial marker channel to receive a marker, having a periphery adapted to frictionally fit within the medial channel defined in the tool body, and a length slightly longer than said medial channel, said cleaning wire holder having a plurality of axially aligned grooves in the peripheral surface thereof, at least some of said grooves carrying magnetically permeable cleaning wires slightly longer than said grooves so that their ends extend therefrom and means of creating magnetic force in the wire holder to releasably bias the cleaning wires in said grooves; and cap structure frictionally engageable upon the second cap end of said tool body to cover the medial channel defined therein.

2. The tool of claim 1 further characterized by:

the first end of the tool body being at a spaced distance from the adjacent tip;

the tool body having a cylindrical striker element defining a medial body channel rotatably carried on the first tip end, at a spaced distance inwardly adjacent the tip, with a radially inwardly extending striking annulus defined at the tip-facing end, the tip facing surface of said annulus defining a striking surface and the annulus defining a medial channel to movable fit about the tip connector; and the tip defining an axially parallel flint channel in its body facing surface, at a spaced distance from the cylindrical periphery, said flint channel carrying a compression spring and a flint biased thereby to frictionally contact the adjacent striking surface of the cylindrical striker.

* * * * *